Jan. 21, 1964   E. M. USHER   3,119,046
OFF-ON INDICATOR FOR THREE-WAY SWITCH CIRCUIT
Filed May 15, 1958

*INVENTOR.*
EDWARD M. USHER
BY
*ATTORNEYS* though extensive conductors are required. Hence the pilot lamp may be designed as part of one of the switch assemblies and manufactured therewith as a unit which may be installed merely by substituting it for the switch originally present in the circuit, or it may be designed as a separate assembly which can be installed as a companion item with a standard switch.

United States Patent Office 3,119,046
Patented Jan. 21, 1964

3,119,046
OFF-ON INDICATOR FOR THREE-WAY SWITCH CIRCUIT
Edward M. Usher, 16 Mount Vernon Road, Upper Montclair, N.J.
Filed May 15, 1958, Ser. No. 735,401
11 Claims. (Cl. 315—129)

This invention relates to electrical circuits whereby a load may be connected to or disconnected from a power source by means of one of a pair (or more) of switches spaced a considerable distance apart along the input conductor and, more particularly, to an indicator circuit which may be associated with one of such switches (especially the switch remote from the load) to indicate whether or not the load is connected to the power source.

It is often desirable to be able to both make or break an electrical circuit at widely spaced points along a conductor so that electrical apparatus connected to a power source by the circuit can be controlled from more than one position. For example, such apparatus may be associated with a pair of remotely spaced single-pole double-throw switches and two alternate input conductors in such a manner that the apparatus can be turned on or off by either switch. Usually in such a circuit the two input conductors are connected between the two throw contacts on the two single-pole double-throw switches, and the pole contacts are connected respectively to the power source and the load. An output or return conductor, of course, leads from the load back to the other terminal of the power source. It is usual in a circuit of this type for each switch to be always connected to one of the two input conductors; the circuit is closed and the load energized if both are connected to the same input conductor, and it is broken and the load disconnected if they are not. It is possible, therefore, to make or break the circuit at either switch if the pole of one switch only is moved from one throw contact to the other.

It will be seen that there is no consistent on or off position for either one of the two switches to indicate whether the load is connected to or disconnected from the power source, since the circuit may be closed in either position of one switch.

In many applications of this type of circuit, the load is spaced at such a distance from either or both of the switches by which it is controlled that it is impossible to know as one switch is thrown whether the circuit is being opened or closed. For this reason an indicating device is often desirable so that it is apparent (particularly at the switch remote from the load) whether the electrical apparatus is on or off at any given time. Such a device may consist of a pilot lamp which lights whenever the movable contacts of the switches are connected to the same input conductor. When the lamp is lighted, therefore, it is known that the load is energized and when it is extinguished it is known that the load is disconnected. Such a pilot lamp may be located at either or both switches.

Heretofore the only practical method of wiring a pilot lamp for the switch remote from the load has been by connecting it to the unswitched conductor at such remote switch and extending an additional conductor from the pilot lamp to the pole contact of the other switch (or to the load terminal that is connected to such pole contact). This requirement increases the initial cost of the installation, and also (in an existing circuit) greatly complicates installation of a pilot lamp.

To overcome these disadvantages, the present invention contemplates a circuit wherein a voltage responsive indicator, such as a pilot lamp, is adapted to indicate whether or not the load is energized, and which is wired solely to one of the switches in such a manner that no The contemplated indicating means is designed for use in an electrical circuit which includes a first switch adapted to connect one terminal of a power source to either one of a pair of input conductors, a second switch remote from the first switch and adapted to connect either one of the input conductors to a load, and an output conductor connecting the load to the other terminal of the power source. The circuit may include intermediate reversing switches connected to the input conductor if more than two control points for the load are desired. The indicating means of the invention comprises two impedances in series connected across the input conductors, and an indicating circuit including a voltage responsive indicator connected between the output conductor and the junction between the impedances. The impedances in the parallel circuit, which may be capacitors, inductances, or resistors, are preferably of substantially equal value, and the impedance of each must be of substantially greater value than the impedances of the load. The voltage responsive indicator may be a pilot lamp (preferably a neon or other gas glow lamp), vacuum tube circuit, relay, or similar device.

A substantially unitary switch assembly employing this indicating means is also contemplated by the invention. It comprises a single-pole double-throw switch having a pole terminal and two throw terminals. Two impedances of substantially equal value are connected together in series across the throw terminals, and a voltage responsive indicator is connected on one side to the junction between the impedances and on the other side to a terminal separate from the switch terminals.

Preferred embodiments of the circuit contemplated by this invention are illustrated in the accompanying drawing, wherein FIG. 1 shows a basic three-way switch circuit, including the new indicator circuit, in which the switches are connected to different input conductors and the load therefore is disconnected;

Figure 5:
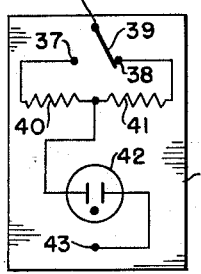
Figure 6:
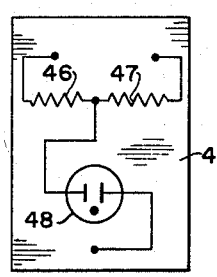

FIG. 5 schematically illustrates a substantially unitary switch assembly according to the invention; and FIG. 6 schematically illustrates a substantially unitary indicator circuit assembly for installation as a companion item with a standard three-way or four-way switch.

Figure 1:
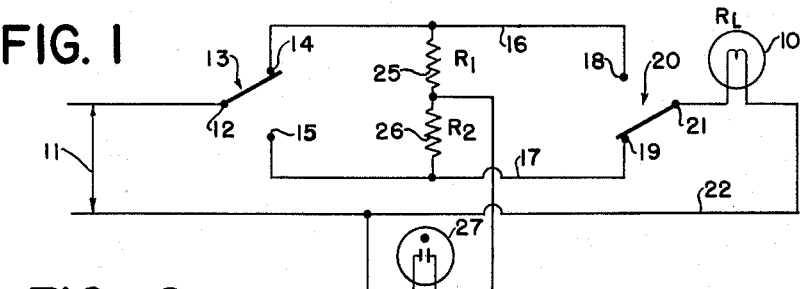
Figure 2:
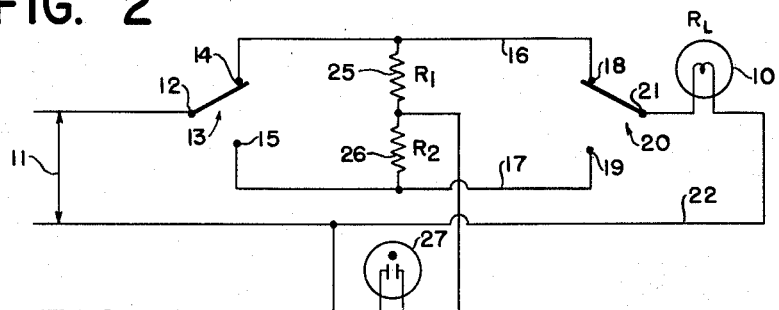
FIG. 2 shows the circuit of FIG. 1 with the switches connected to the same input conductor and the load therefore energized.

Referring first to FIGS. 1 and 2, a load 10 is shown for purposes of illustration as an electric light adapted to be energized by a power source 11. One terminal of the power source 11 is connected to the pole contact 12 of a single-pole double-throw switch 13 which is at all times connected by the movable switch pole to one or the other of the two throw contacts 14 and 15. Two substantially coextensive input conductors 16 and 17 are connected at one end respectively to the throw contacts 14 and 15 and at the other end to corresponding throw contacts 18 and 19 respectively of a second single-pole double-throw switch 20. The switch 20 also includes a pole contact 21 which at all times is connected by the switch pole to one or the other of the throw contacts 18 or 19 and to the load 10. An output or return conductor 22 leads from the load 10 back to the other terminal of the power source 11.

When the switches 13 and 20 are in such position that their pole contacts 12 and 21 are respectively connected to different input conductors, as shown in FIG. 1, the load 10 is not operatively connected to the power source 11. However, if the position of the switch 20 is changed so that the pole contact 21 is connected to the throw contact 18, without changing the position of the pole of the other switch 13, the circuit will appear as shown in FIG. 2 and both switches will be connected to the same input conductor 16. The load 10 will then be energized. The position of the switch 13 could be changed, of course, instead of that of the switch 21, to energize the load through the other input conductor 17. It is clear, therefore, that since both of the switches always connect to one of the input conductors the circuit may be opened or closed at any time simply by changing the position of one of the switches.

If either or both of the switches are located at a great distance from the load 10, it is quite possible to change the position of one of the switches without knowing whether the load 10 is being connected to or disconnected from the power source 11. For example, the switch 13 might be placed at the head of a flight of stairs, the switch 20 at the foot of the stairs, and the load 10 (in this case an electric light) at a considerable distance beyond the switch 20. If it would be desired to have the light on before descending the stairs, and if the light could not be seen from the head of the stairs, it would not be known whether the switch 13 should be thrown or not. Some indicating means could very well be required, therefore, so that one could be aware at the switch 13 whether the light was on or off at any given time.

For purposes such as this, the present invention contemplates connecting two resistances 25 and 26 (or other impedances) in series with one another across the input conductors 16 and 17 at the switch 13 where the indicating means is to be located. A voltage responsive indicator, shown here as a glow discharge pilot lamp 27, is connected to the junction between the resistors 25 and 26 and to the output conductor 22. The resistance value $R_1$ of the resistor 25 preferably is substantially equal to the resistance value $R_2$ of the resistor 26, and each in turn is much greater than the resistance $R_L$ of the load 10. These resistance values should be high enough so that when the switches are in the position shown in FIG. 1, the current by-passed through them to and through the load is of inconsequential magnitude.

Under the conditions of FIG. 1, the load 10 is disconnected from the power source 11 and it is desired that the pilot lamp 27 be extinguished. Current of very low value flows from the power source 11 through the switch 13 through the high resistance $R_1$ of the resistor 25, and then divides between the pilot lamp 27 on one side and the resistor 26 in series with the load 10 on the other. Under these conditions, with suitably high resistances $R_1$ and $R_2$, the voltage drop across the pilot lamp 27 is only about half that of the source 11 and is less than the operating voltage of the lamp 27; as a result the lamp is extinguished.

When the pole of the switch 20 is thrown to connect the load to the throw contact 18, the circuit appears as shown in FIG. 2 and the load 10 is energized. Current from the power source 11 then flows through the input conductor 16 from the switch 13 and is divided between the load 10 on one side and the resistor $R_1$ connected in series with the pilot lamp 27 on the other. Since the load 10 and the indicator circuit comprising the resistor 25 in series with the pilot lamp 27 are now connected in parallel to the source 11, the voltage drop across the neon pilot lamp 27 will increase to a value approximately the voltage of the source 11, and if the starting voltage of the lamp is properly chosen it will be exceeded and the lamp will be lighted. Thus the lamp 27 is on when the load is energized and is off when the load is disconnected.

By making the resistance values $R_1$ and $R_2$ of the resistors 25 and 26 sufficiently large relative to the resistance $R_L$ of the load 10, the increase in the voltage drop across the lamp when the load is energized can be correspondingly increased. It is then simple enough to correlate the values of the resistances $R_1$ and $R_2$ with the starting voltage characteristics of the pilot lamp 27 to insure that the lamp will light whenever the load is energized and will be extinguished whenever the load is de-energized. To be sure that the voltage applied to the lamp is the same when the switches connect to either input conductor, the resistance values $R_1$ and $R_2$ should be substantially equal.

Following is an example of a particular combination of components which has been found to perform very satisfactorily in an indicator circuit used in a 110 volt A.C. three-way switch circuit controlling a 50 watt incandescent lamp as the load: The circuit was as shown in FIGS. 1 and 2, $R_1$ and $R_2$ were 1 watt 50,000 ohm resistances, and the pilot lamp 27 was a type NE51 neon glow lamp which ignites at or about 120 volts peak A.C. and becomes extinguished when the peak A.C. voltage applied to it drops below about 90 volts.

Figure 3:
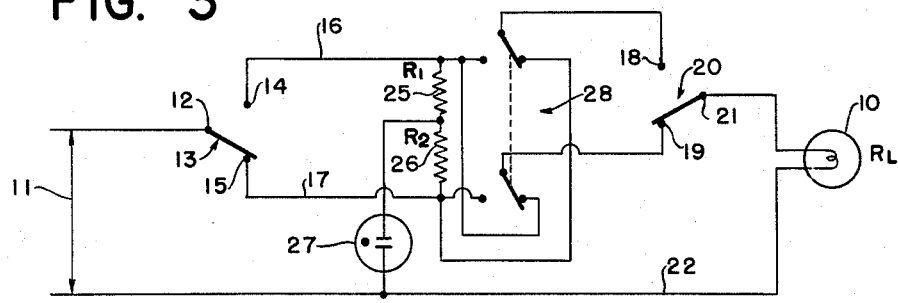
FIG. 3 shows a circuit similar to the basic circuit of FIGS. 1 and 2, but with a reversing switch connected to the input conductor to provide an additional control point for the load, and with the new indicator circuit connected at the reversing switch.

FIG. 3 shows essentially the same circuit as that of FIGS. 1 and 2, except that a standard four-way switch (i.e., a double pole, double throw switch connected internally as a reversing switch) 28 is connected to the input conductors at a point between the three-way switches 13 and 20 to provide an additional switch from which the load 10 can be controlled. Here the indicator circuit comprising the resistances $R_1$ and $R_2$ and the pilot lamp 27 are connected at this switch. It is clear that any desired number of four-way switches 28 can be included in the load circuit, and that the pilot lamp indicator circuit of this invention can be connected at any one of them as well as at either of the terminal three-way switches.

Figure 4:
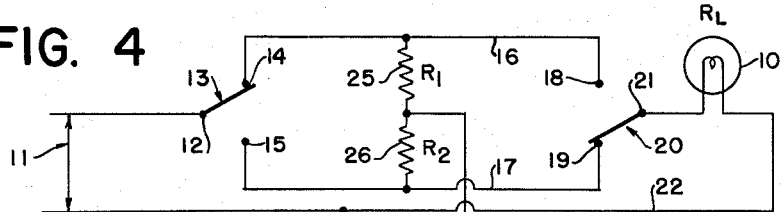
FIG. 4 shows a modified indicator circuit adapted to employ a neon or other lamp having a low extinction voltage characteristic as the indicator element.

If the voltage of the power source 11 is of particularly high value relative to the extinction voltage characteristic of the pilot lamp, a protective resistor 30 may be connected in the indicating circuit in series with the pilot lamp 27 as shown in FIG. 4 (all the main elements of FIG. 4 are the same as those of FIGS. 1 and 2 discussed above). By suitably choosing the resistance values of the protective resistor 30 it is possible to use the same pilot lamp and voltage dividing resistors 25 and 26 for circuits subjected to various line voltages.

Alternatively, or in addition, to the resistor 30, a resistor 31 as shown by the dotted lines in FIG. 4 may be connected in parallel with the pilot lamp 27 to adapt the lamp and indicator circuit to high line voltages relative to lamp extinction voltage. Either or both of the resistors 30 and 31 may be employed, as desired. Virtually any voltage responsive indicator (e.g., vacuum tube circuit or relay) can be employed instead of the glow discharge pilot lamp 27, so long as it has the correct voltage characteristics. Also, inductances or capacitors may be used in place of the resistors 25, 26, 30 and 31 to provide the required impedances in alternating current circuits.

The invention contemplates a substantially unitary switch assembly which may be installed in a three-way switching circuit to replace one of the switches in that circuit (ordinarily, that switch most remote from the load). The contemplated switch assembly includes in one unit the impedances and the voltage responsive indicator described in reference to FIGS. 1–4 and provides suitable terminals by which these elements may be connected into the three way switching circuit to replace one of the switches.

As is schematically illustrated in FIG. 5, this switch assembly includes a frame 35 upon which is mounted a single-pole double-throw switch (it could equally well be a double-pole double-throw switch connected internally as a reversing switch) including a pole terminal 36, two throw terminals 37 and 38 and a switch pole member 39. Though it is not illustrated as such in the schematic drawing, this switch may be of the snap-action variety if desired. Two resistors 40 and 41 of substantially equal resistance are also mounted on the frame 35 and are connected together in series between the throw terminals 37 and 38. A glow discharge pilot lamp 42 is connected on one side as shown to the junction between the resistors 40 and 41 and on the other side to a terminal 43 separate from the terminals of the switch.

To install this switch assembly in a conventional three-way switching circuit, one switch (as, for example, the switch 13) is removed thus exposing the ends of the line input conductor and the two alternate input conductors 16 and 17. The line output conductor 22 is generally positioned along side the line input conductor and the alternate input conductors 16 and 17 in the switch box. After the switch 13 has been removed, the switch assembly of FIG. 5 is installed in its place by any suitable attachment means on the frame 35, and the line input conductor is electrically connected to the pole terminal 36. The alternate input conductors 16 and 17 are electrically connected to the two throw terminals 37 and 38 respectively and the line output conductor 22 is electrically connected to the separate terminal 43. The glow discharge pilot lamp 42 then serves to indicate whether a load actuated by the three-way switching circuit is energized when the switch in the switch assembly is thrown.

FIG. 6 schematically illustrates a unitary assembly of the indicator circuit itself, independent of the switch, such as may be installed as a companion item to a standard three-way or four-way switch. The assembly is essentially the same as that of FIG. 5, except that the switch is omitted. It comprises a frame 45 upon which is mounted two resistors 46 and 47 and a neon pilot lamp or equivalent indicator element 48. One terminal of each resistor and of the lamp 48 are connected together, and the other terminal of each of these components is connected to a separate binding post terminal. This assembly may be installed in a switch box alongside a standard switch as a companion piece, and connected in the load circuit as illustrated in FIGS. 1 to 4. By employing the principles described in reference to the circuits of FIGS. 1-4 in a switch assembly in this manner, the unitary assembly can be advantageously installed as a replacement for or companion to an existing switch in a three-way switch circuit and can be connected without extending any conductors to the other switch or to the load. It is also to be noted that virtually all of the variations which may be made in the circuits of FIGS. 1-4 are equally applicable to the unitary assemblies of FIGS. 5 and 6.

I claim:

1. In an electrical circuit including a first switch adapted to connect one terminal of a power source to either one of a pair of input conductors, a second switch remote from said first switch adapted to connect either one of said input conductors to a load, and an output conductor connecting the load to the other terminal of the power source, means for indicating whether said switches connect to the same input conductor comprising two impedances in series connected across said input conductors, and an indicating circuit including a voltage responsive indicator connected between said output conductor and the junction between said impedances, said impedances being much greater in value than the impedance of said load.

2. In an electrical circuit including a first single-pole double-throw switch adapted to connect one terminal of a power source to either one of a pair of input conductors, a second single-pole double-throw switch remote from said first switch adapted to connect either one of said input conductors to a load, and an output conductor connecting the load to the other terminal of the power source, means for indicating whether said switches connect to the same input conductor comprising two resistors in series connected across said input conductors, and an indicating circuit including a voltage responsive indicator connected between said output conductor and the junction between said resistors, said resistors being of substantially equal resistance and of substantially greater resistance than the resistance of said load.

3. In an electrical circuit including a first switch adapted to connect one terminal of a power source to either one of a pair of input conductors, a second switch remote from said first switch adapted to connect either one of said input conductors to a load, and an output conductor connecting the load to the other terminal of the power source, means for indicating whether said switches connect to the same input conductor comprising two resistors of substantially equal resistance in series connected across said input conductors, and an indicating circuit including a pilot lamp connected between said output conductor and the junction between the resistors, said load being of substantially less resistance than the equal resistors.

4. In an electrical circuit including a first single-pole double-throw switch adapted to connect one terminal of a power source to either one of a pair of input conductors, a second single-pole double-throw switch remote from said first switch adapted to connect either one of said input conductors to a load, and an output conductor connecting the load to the other terminal of the power source, means for indicating whether said switches connect to the same input conductor comprising two resistors of substantially equal resistance connected in series across said input conductors, and an indicating circuit including a glow discharge pilot lamp connected between said output conductor and the junction between the equal resistors, said load being of substantially less resistance than either of the resistors.

5. In an electrical circuit including a first switch adapted to connect one terminal of a power source to either one of a pair of input conductors, a second switch remote from said first switch adapted to connect either one of said input conductors to a load, and an output conductor connecting the load to the other terminal of the power source, means for indicating whether said switches connect to the same input conductor comprising two impedances of substantially equal value connected in series across said input conductors, and an indicating circuit including a voltage responsive indicator and a protective impedance connected together and between said output conductor and the junction between the equal impedances, the impedance of said load being of substantially less value than either of the equal impedances.

6. In an electrical circuit including a first switch adapted to connect one terminal of a power source to either one of a pair of input conductors, a second switch remote from said first switch adapted to connect either one of said input conductors to a load, and an output conductor connecting the load to the other terminal of the power source, means for indicating whether said switches connect to the same input conductor comprising two resistors of substantially equal resistance connected in series across said input conductors, and an indicating circuit including a pilot lamp and a protective resistor in series connected between said output conductor and the junction between the equal resistors, the resistance of said load being of substantially less value than that of either of the equal resistors.

7. In an electrical circuit including a first switch adapted to connect one terminal of a power source to either one of a pair of input conductors, a second switch remote from said first switch adapted to connect either one of said input conductors to a load, and an output conductor connecting the load to the other terminal of the power source, means for indicating whether said switches connect to the same input conductor comprising two resistors of substantially equal resistance connected in series across said input conductors, and an indicating circuit including a pilot lamp and a protective resistor in parallel connected between said output conductor and the junction between the equal resistors, the resistance of said load being of substantially less value than that of either of the equal resistors.

8. A substantially unitary switch assembly adapted to indicate the on-off condition of a load of established maximum impedance value which is connected to a power source by a three-wire circuit through said switch assembly and through at least one additional double-throw switch, said assembly comprising a supporting frame, a single-pole double-throw switch having a pole terminal and two throw terminals mounted on said frame, four binding posts mounted on said frame for connecting said assembly to external wires of said three-wire circuit, three of said binding posts being connected one to each of the three terminals of said switch, two fixed impedances of substantially equal value and each of a value substantially greater than said maximum impedance value of the load supported on said frame and connected together in series across the throw terminals of said switch, and a voltage-responsive indicator also mounted on said frame, said indicator having a pair of terminals one of which is connected to the connection between said impedances and the other of which is connected to the fourth of said binding posts.

9. Apparatus according to claim 8 in which the impedances are resistances and in which the voltage-responsive indicator is a glow-discharge pilot lamp.

10. A substantially unitary indicator device adapted to indicate the on-off condition of a load of established maximum impedance value which is connected to a power source by a three-wire circuit through at least two double-throw switches, said device comprising a supporting frame, three binding posts mounted on said frame for connecting said device to external wires of said three-wire circuit, two fixed impedances of substantially equal value and each of a value substantially greater than said maximum impedance value of the load supported on said frame and connected together in series across two of said binding posts, and a voltage-responsive indicator mounted on said frame, said indicator having a pair of terminals one of which is connected to the connection between said impedances and the other of which is connected to the third of said binding posts.

11. A device according to claim 10, in which the impedances are resistances and in which the voltage-responsive indicator is a glow discharge pilot lamp.

References Cited in the file of this patent

UNITED STATES PATENTS

| | | |
|---|---|---|
| 366,124 | McElroy | July 5, 1887 |
| 465,805 | Smith | Dec. 22, 1891 |
| 529,532 | Scribner | Nov. 20, 1894 |
| 1,816,690 | Moore | July 28, 1931 |
| 1,957,801 | Rabezzana | May 8, 1934 |
| 2,201,898 | Holiday | May 21, 1940 |
| 2,345,042 | Frundt et al. | Mar. 28, 1944 |
| 2,363,396 | Carlson | Nov. 21, 1944 |
| 2,622,139 | Dodd | Dec. 16, 1952 |
| 2,693,593 | Crosman | Nov. 2, 1954 |
| 2,696,607 | Witkin | Dec. 7, 1954 |
| 2,822,535 | Fields | Feb. 4, 1958 |
| 2,914,703 | Clark | Nov. 24, 1959 |

FOREIGN PATENTS

| | | |
|---|---|---|
| 991,232 | France | June 20, 1951 |